Feb. 9, 1971 W. A. MARTIN 3,561,851
MOVIE CAMERA FILM CARTRIDGE
Filed Aug. 13, 1968 3 Sheets-Sheet 1

WILLIAM A. MARTIN
INVENTOR.

BY William F. Delaney Jr.
Robert W. Hampton

ATTORNEYS

WILLIAM A. MARTIN
INVENTOR.

Feb. 9, 1971

W. A. MARTIN 3,561,851

MOVIE CAMERA FILM CARTRIDGE

Filed Aug. 13, 1968

WILLIAM A. MARTIN
INVENTOR.

BY *William F. Delaney Jr.*
*Robert W. Hampton*

ATTORNEYS

United States Patent Office 3,561,851
Patented Feb. 9, 1971

3,561,851
MOVIE CAMERA FILM CARTRIDGE
William A. Martin, Rochester, N.Y., assignor to Eastman Kodak Company, Rochester, N.Y., a corporation of New Jersey
Filed Aug. 13, 1968, Ser. No. 752,399
Int. Cl. G03b 23/02
U.S. Cl. 352—78                                    11 Claims

ABSTRACT OF THE DISCLOSURE

A filmstrip cartridge for a movie camera having a pair of chambers arranged so that film can be driven from one chamber to the other through alternate "sound" or "silent" film paths without using a driving take-up core. Film from a supply roll in one chamber is advanced by the action of the camera pull-down claw past an exposure aperture through either of the alternative paths to a pivotal arm which feeds the film into a rotatable holder in the other chamber. A lead portion of the advanced film is directed by the arm into engagement with a side wall of the holder to cause the holder to rotate and convolute received film as subsequent portions of the film are directed radially inwardly of film coiled in the holder. The cartridge may be provided with means for indicating the amount of film advanced by the pull-down mechanism during use of the camera.

BACKGROUND OF THE INVENTION

The present invention relates to filmstrip cartridges, and more particularly to movie camera cartridges having supply and take-up chambers.

Present commercially available movie camera cartridges of the type having adjacent supply and take-up chambers include a driven take-up core in the take-up chamber. Prior to being exposed, the film in such a cartridge is coiled in the supply chamber with its lead portion guided past an exposure aperture and attached to the take-up core. When such a cartridge is in proper position in a movie camera, a film advancing claw in the camera engages perforations in the film during operation of the camera to intermittently pull the film from the supply coil and transport it past the exposure aperture to the take-up core. A take-up drive in the camera is operatively coupled to the take-up core of the cartridge to positively drive the take-up core in order to reduce slack in the filmstrip and prevent jamming of the filmstrip. Since the speed of rotation of the take-up core must vary as the film accumulates thereon, it is also customary to provide a clutch between the take-up core and the take-up drive.

Attachment of the lead portion of the film to the take-up core in a cartridge complicates film removal procedures for development processing, since the film must be released from the core prior to such processing. Such attachment also limits the versatility of the cartridge in that the film path must be established when the cartridge is assembled and only a single film path can be practically achieved.

Many commercially available cartridges also include devices to overcome the tendency of coiled film to clockspring when the cartridge is subjected to sharp movements. The term "clockspring" as used herein, means radial displacement of successive outer convolutions of a film roll, caused by the tendency of the roll to unwind. Anti-clockspring devices in the take-up chamber of most commercial cartridges operate on the core in such a manner that reverse rotation of the core is prevented. However, such devices also prevent the film from being driven in reverse for lap and dissolve operations or for removal of the exposed film through the exposure aperture of the cartridge.

Easy film removal is additionally complicated in most commercially available cartridges by several tight bends in the film path, provided to isolate intermittent film motion past the exposure aperture from adverse inertia effects of the supply and take-up rolls.

SUMMARY OF THE INVENTION

In a cartridge according to the present invention a filmstrip can be advanced by a camera pull-down mechanism from a supply chamber to a take-up chamber without the use of a take-up core or an anti-clockspring device. Consequently, the filmstrip can be easily driven in reverse for lap and dissolve operation or for removal from the cartridge through the exposure aperture for development processing, and alternative film paths may be provided for "sound" or "silent" operation.

In a preferred embodiment a film cartridge is provided with a rotatable take-up holder for receiving and coiling exposed film, and a movable feeder arm for directing film into the holder to convolute the film radially inwardly as the holder is caused to rotate by force of advanced film. In such a cartridge film is advanced by a film advance mechanism in a camera from a supply chamber past an exposure aperture, through the movable feeder arm, and into the rotatable holder. The feeder arm is movably mounted to direct a lead portion of the advanced film into engagement with a side wall of the rotatable holder. The force of the advanced film tends to cause the holder to rotate, as the lead portion of the film is directed into a coil against the side wall of the holder. The feeder arm directs subsequently advanced portions of the film radially inwardly of the side wall of the holder and inwardly of film previously received in the holder, to thereby cause the film to be convoluted radially inwardly of the side wall of the holder. This inverse winding feature eliminates the need for an externally driven take-up core or for an anti-clockspringing device. The cartridge may also be provided with means for selecting alternative film paths for "sound" or "silent" operation, since the lead portion of the film is not attached to a core. The film paths need no tight bends between the exposure and the take-up chamber to simplify film removal through the exposure aperture for processing. A simple footage indicator, actuated by the feeder arm which tracks film in the take-up cup may also be provided to indicate the footage advanced by the film feeding mechanism.

DESCRIPTION OF THE PREFERRED EMBODIMENT

Figure 1:
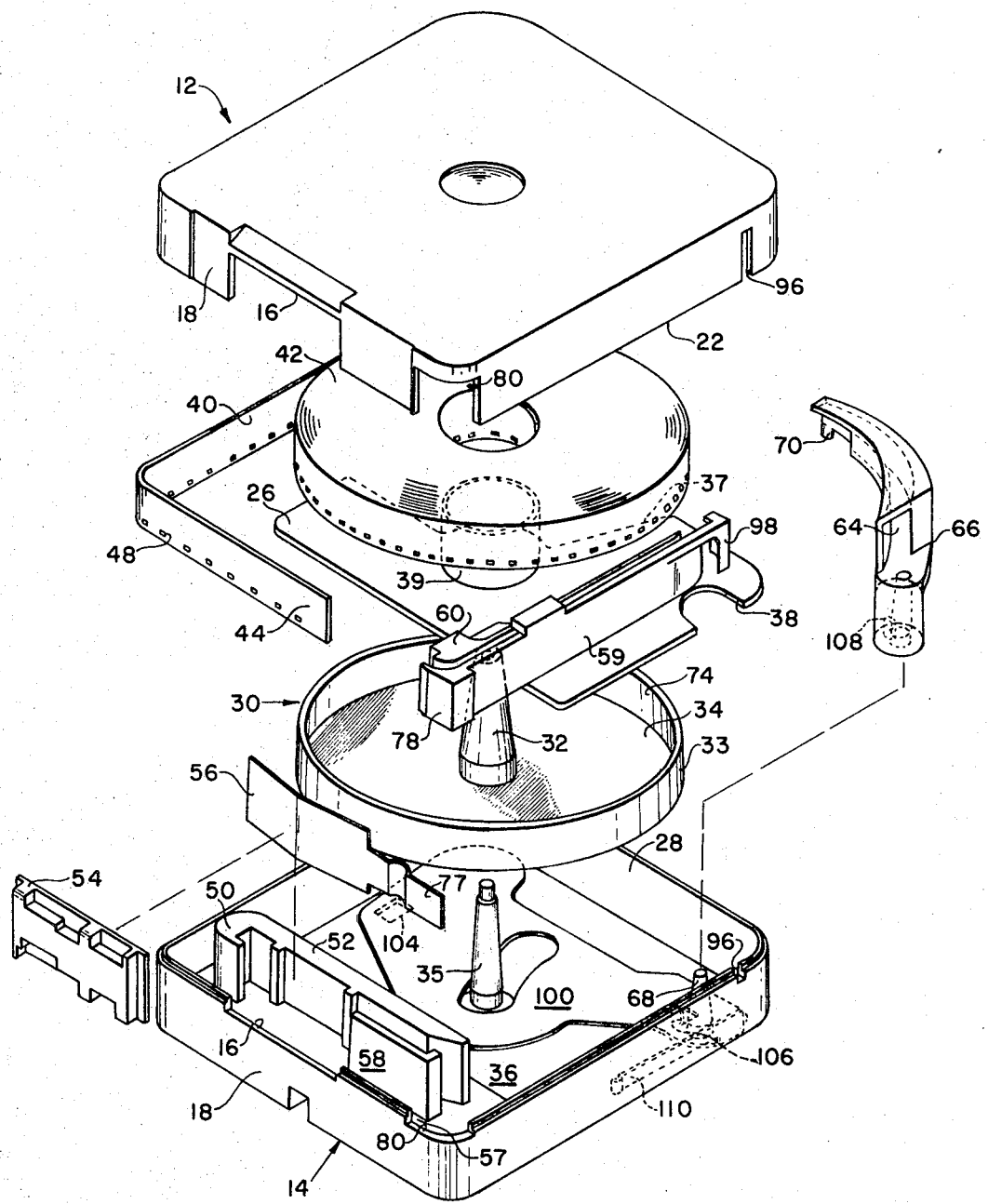
FIG. 1 is an exploded perspective view of a preferred embodiment of a cartridge according to the present invention.
Figure 2:
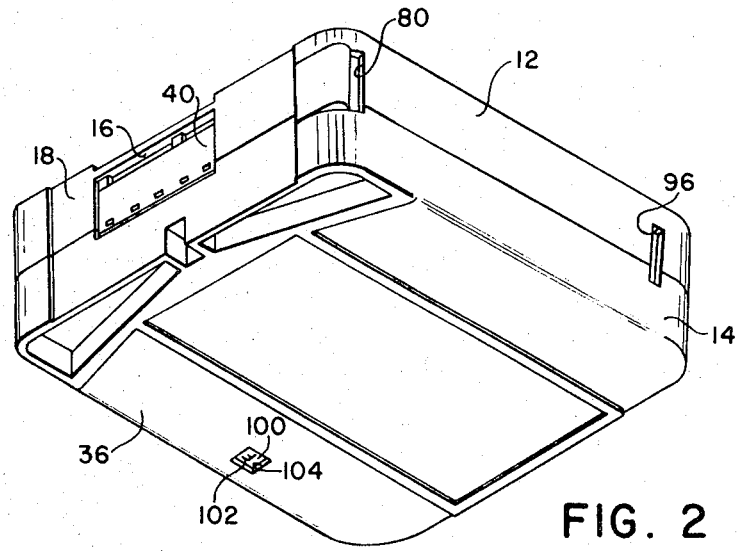
FIG. 2 is a perspective view of the cartridge in assembled form.

An exploded view of a cartridge constructed according to the present invention is shown in FIG. 1. The cartridge comprises a pair of cup-shaped, mating containers 12 and 14 which form a substantially light-tight housing when assembled, as shown in FIG. 2. When the cartridge is properly loaded into a movie camera (not shown), an exposure aperture 16 in a front wall 18 will be positioned in alignment with a lens system 20 (FIG. 3) in the camera. The container 12 and a partition 26 define a supply chamber 22 which may include integrally molded guide walls (not shown) for preventing clockspringing of film coiled in the chamber. The container 14 and the partition 26 define a take-up chamber 28 in which a freely rotatable cup or holder 30 is located. The cup or holder has a hollow hub 32 and a side wall 33 that are integrally formed with a bottom wall 34 in the disclosed embodiment. The hub enables the holder to be assembled on a spindle 35 that projects from a wall 36 of the container 14. The common wall or partition 26 separating the supply and take-up chambers is provided with segmented openings 37 and 38, and an optional integrally formed hub 39 that extends into the supply chamber 22.

When the cartridge is assembled and loaded, a filmstrip 40 in the form of a coil 42 is located in the supply chamber 22 coaxial to the hub 39. The lead portion 44 of the filmstrip 40 is initially positioned along a film path leading from the supply chamber 22 around a curved guide surface 50 of a guide member 52 and over a pressure pad 54 which is biased outwardly of the exposure aperture 16 by a spring 56. In operation of the cartridge, the portion of the film 40 positioned adjacent the exposure aperture is advanced along the film path by a film advancing means which may comprise a pull-down claw 46 (FIG. 5) within a camera (not shown), which is arranged to intermittently engage and advance the film frame-by-frame in forward or reverse directions in response to operation of a reversible drive mechanism which may take various forms well known to those skilled in the art.

Figure 4:
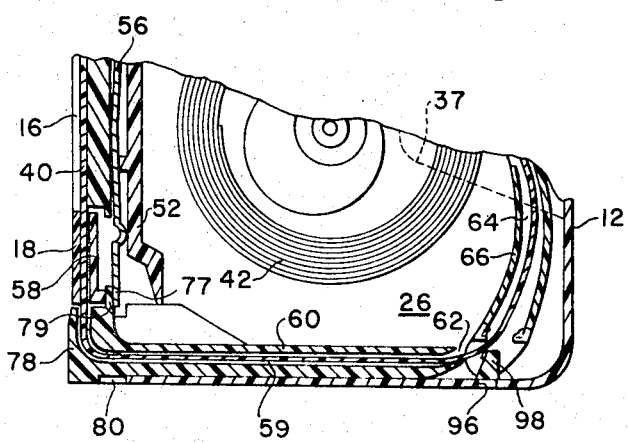
FIG. 4 is a fragmentary sectional view through a portion of the cartridge showing the film directed along a film path for "silent" operation.
Figure 5:
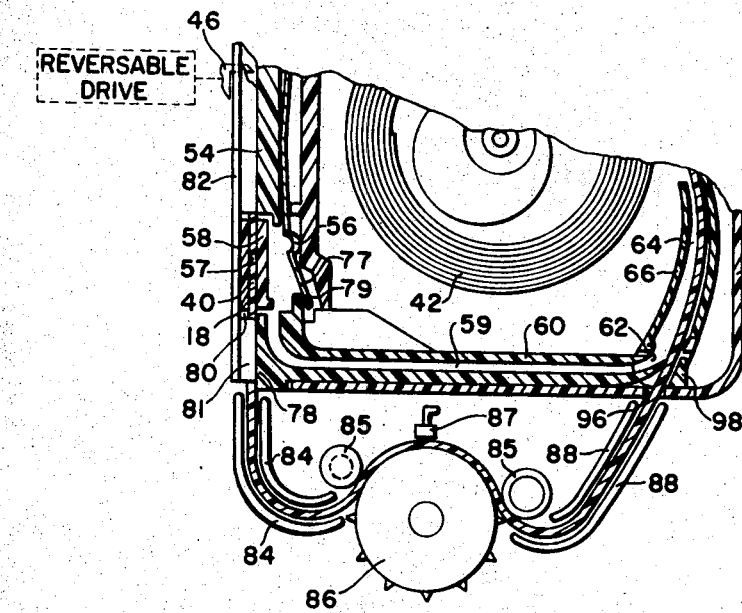
FIG. 5 is a view of the cartridge similar to FIG. 4, including parts of a reversible drive sound camera.

As shown more clearly in FIGS. 4 and 5, the camera pull-down claw 46 engages the film adjacent the exposure aperture 16 and advances it through a film passage 57 defined by the front wall 18 of the cartridge and a guide member 58. The film passage 57 directs the advancing film into a film guide channel 59 defined by a slide member 60 from which the film is directed into a tapered, curving, sloping guide channel 64 through a feeder arm 66 that extends through the opening 37 in the partition 26 and terminates in the holder 30. As shown in FIG. 1 the feeder arm 66 is pivotally mounted on a spindle 68 that extends through the aperture 38 from the wall 36 of the container 14. A guide pin 70 extends from the terminal end of the feeder arm 66 toward the bottom wall 34 of the holder 30.

Figure 7:
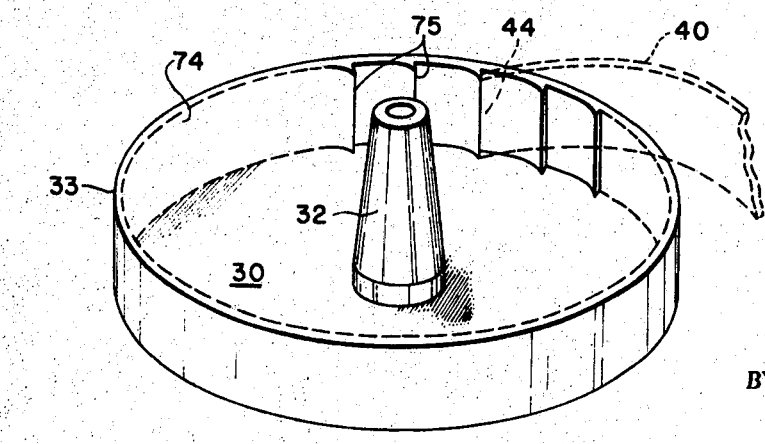
FIG. 7 is a perspective view of the rotatable take-up cup of the cartridge.

As will later be described, the feeder arm is lightly biased radially outwardly of the holder 30, so that the terminal end of the feeder arm and the guide pin 70 are urged toward the side wall 33. Advanced film emerging from the guide channel 64 at the terminal end of the pivotal feeder arm 66 is directed radially inwardly of the side wall 33 and of the guide pin 70, and is received by the holder 30. The side wall 33 defines a film engaging surface 74 that is provided with film engaging means, such as flanges 75, as seen in FIG. 7. The lead portion 44 of the advanced filmstrip 40 is thus directed by the biased feeder arm into engagement with the film engaging surface 74 of the holder 30, and the film is caught and becomes fixedly held by the film engaging means on the surface 74. When this happens, the freely rotatable holder 30 is rotated by the advancing filmstrip 40, and the lead portion 44 of the filmstrip 40 advances with the rotating side wall 33 under the feeder arm 66 and radially outwardly of the guide pin 70. Film subsequently emerging from the feeder arm 66 passes radially inside the guide pin 70, around the chamber radially inwardly of previously received film convolutions, and then radially outside the guide pin 70. Film received in the holder is thus formed into convolutions by direction of the feeder arm and rotation of the holder. Since the guide pin 70 is biased toward the wall 33, it is urged against the last formed convolution of film in the take-up holder 30.

The camera pull-down claw and the film advancing mechanism are shown in FIG. 5 schematically and not in detail, since they may take various forms well known in the art. The camera pull-down claw provides all of the drive required for film advance and for take-up, and no other coupling or driving connection is required in a cartridge constructed according to the present invention. Since the cartridge does not require an anti-clockspring device in the take-up chamber, the film can be driven in reverse for lap-and-dissolve in a camera provided with a reversible drive for the pull-down claw 46, as schematically shown in FIG. 5.

Considering now the alternative "sound" or "silent" optional feature of the disclosed cartridge, the slide member 60 is movable relatively to the separator plate 26 within a groove (not shown) in the partition 26. Although this member may be made non-sliding to function as a fixed film guide, its "slide" capability adds to the versatility of the cartridge and makes it adaptable for use with "silent" or "sound" film. One end 77 of the pressure pad spring 56 abuts against a surface 79 of the slide member 60 as shown more clearly in FIGS. 4 and 5 to urge the slide member to a forward "silent" position as seen in FIG. 4 when the cartridge is not in a sound equipped camera. In this forward position the front portion of the slide member 60 containing the end surface 78 serves a light blocking function with respect to opening 80 in the wall of the cartridge.

Figure 3:
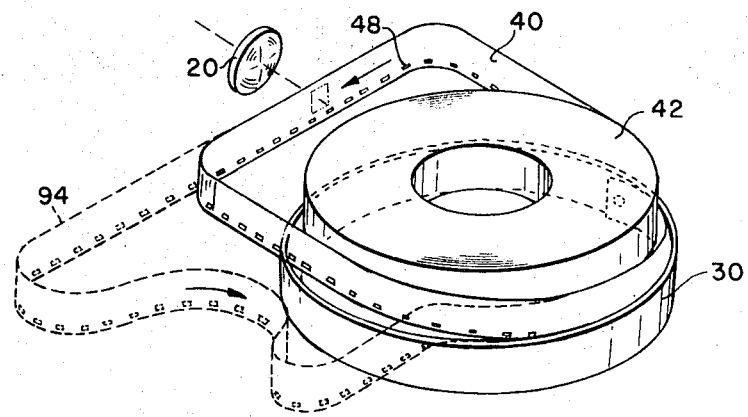
FIG. 3 is a perspective view of the filmstrip illustrating two alternate paths to the take-up cup of the cartridge.
Figure 6:
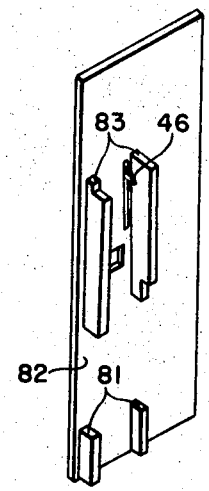
FIG. 6 is a perspective view of the camera aperture plate shown in FIG. 5.

When the cartridge is loaded in a camera equipped with sound recording apparatus, as seen in FIG. 5, then the camera aperture plate 82 shown also in FIG. 6 would be provided with suitable abutments 81 below film alignment abutments 83. The abutments 81 would engage the end surface 78 of the slide member 60 when the cartridge is inserted in the camera to move the member rearwardly against the spring bias toward the feeder arm 66. When the slide member is in this rearwardly or "sound" position, the opening 80 is unblocked, and at the same time the opening of the film guide channel 59 is moved out of alignment with the film passage 57. Film 40 advanced through passage 57 is directed through the unblocked opening 80 out of the cartridge along an alternative "sound" path 94, as schematically indicated in FIG. 3. This film path 94 is defined by schematically illustrated guide means 84 within the camera, which direct the film around guide rollers 85 and a sound drum 86 where sound is recorded by means of a sound head 87. The film 40 is then directed by guide means 88 back into the cartridge interior through an entryway 96, that is predominantly in the container 12. From entryway 96, the film feeds into the guide channel 64 of the feeder arm 66 for subsequent movement into the freely rotatable cup or holder 30 in the manner previously described. Movement of the slide member 60 into its rearward position also unblocks the entryway 96, which is normally blocked by a panel 98 of slide member 60 in its forward "silent" position.

As stated above, cartridges according to the present invention are adapted to the provision of a simple footage indicator. A footage indicator arm 100 is shown in FIG. 1 as pivotally mounted on the spindle 68 in the take-up chamber 28. The arm 100 contains footage indications 102 (FIG. 2) that appear in an indicator aperture 104 in the wall 36 of the container 14. A lug 106 on the indicator arm 100 is received within an opening 108 in the guide arm 66, so that the indicator arm 100 will be moved counterclockwise as the guide arm is moved radially inwardly by the increasing film convolutions. A spring member 110 is employed to lightly bias the arm 100 clockwise, so that the guide pin 70 on the indicator arm 66 will be biased radially outwardly of the holder 30 as noted above and will maintain contact with the inner convolution of exposed film. The build-up of film convolutions in the holder gradually urges the biased guide pin 70 inwardly, thereby enabling the entering film to be accurately tracked by the feeder arm 66. Thus, the position of the indicator arm 100 is indicative of the amount of exposed film coiled in the take-up holder.

It will be apparent from the preceding description that the drive for the take-up operation is provided by the film advancing mechanism of the camera, to thereby eliminate the need for a separate drive for winding up exposed film.

The invention has been described in detail with particular reference to the preferred embodiment thereof, but it will be understood that variations and modifications can be effected within the spirit and scope of the invention as described hereinabove and as defined in the appended claims.

I claim:

1. In a film cartridge for use in a motion picture camera having film advancing means, said cartridge having means defining a supply chamber, and an exposure aperture, and including means for guiding film advanced by the film advancing means from the supply chamber past the exposure aperture, the improvement comprising:

a take-up holder rotatably mounted in the cartridge for receiving and coiling the advanced film, said holder having a bottom wall and a side wall having a film engaging surface; and means for directing film advanced past the exposure aperture to said holder and into engagement with said film engaging surface of said holder to cause the holder to rotate by the force of the advanced film, as the advanced film is received and coiled radially inwardly in said holder.

2. In a film cartridge for use in a motion picture camera film advancing means, said cartridge having means defining a supply chamber, and an exposure aperture, and including means for guiding film advanced by the film advancing means from the supply chamber past the exposure aperture, the improvement comprising:

a rotatable holder in the cartridge for receiving and coiling an advanced film, said holder having a bottom wall for engaging an edge of the convolutions forming the coil and a side wall having means for positively engaging film; and a feeder arm having a film passage therein, said arm being movably mounted to receive into the passage film advanced past the exposure aperture and to direct a lead portion of the received film through the passage into engagement with the film engaging means of the side wall of the holder to cause the holder to rotate and coil the film engaging the side wall, and to direct subsequently received film radially inwardly of the film coiled in the holder to thereby cause the film to be convoluted radially inward of said side wall within said holder.

3. In a motion picture film cartridge having means defining a supply chamber, an exposure aperture, and a take-up chamber and including guide means defining a film path from the supply chamber past the exposure aperture, said exposure aperture adapted to receive a camera pull-down claw for intermittently advancing film along the film path past the exposure aperture, the improvement comprising:

a take-up holder rotatably mounted in the take-up chamber for receiving and coiling film, said holder having a bottom wall for engaging an edge of the convolutions forming the coil and a side wall for engaging the outermost convolution of the coil;

a movably mounted feeder arm having a film passage therein for receiving film advanced past the exposure aperture; and means for moving said arm to direct a lead portion of the received film as it emerges from the passage into engagement with the side wall of the holder to cause the holder to rotate and coil the film in the holder, and to direct subsequent portions of the received film radially inwardly of the innermost convolution of the film coiled in the holder.

4. The improvement claimed in claim 3, further comprising:

means defining an alternate film path for recording sound on the film; and means for selecting one of the film paths.

5. In a film cartridge for use in a motion picture camera having film advancing means, said cartridge having means defining a supply chamber, and an exposure aperture, and including guide means for guiding film from the supply chamber past the exposure aperture, the improvement comprising:

a take-up holder rotatably mounted in the cartridge for receiving film, said holder defining a bottom wall and a side wall for engaging film;

a feeder arm having a film passage therein, said arm being pivotally mounted adjacent the take-up chamber to receive film advanced past the exposure aperture; and follower means on said arm extending into said holder, said arm being biased radially outwardly of said holder to urge said follower means toward the side wall of said holder for directing a lead portion of the advanced film emerging from said passage into engagement with the side wall of the holder to cause the holder to rotate and coil the film engaging the side wall and for engaging the innermost spiral of film coiled in said holder to direct subsequently emerging portions of the advanced film radially inwardly of the film coiled in the holder to cause the film to be convoluted radially inwardly.

6. In a film cartridge having means defining a supply chamber, and an exposure aperture, and including guide means defining a film path from the supply chamber past the exposure aperture, said cartridge being adapted for use in a motion picture camera having claw means for engaging film adjacent the exposure aperture and having means for reversibly driving the claw means for advancing the film through the film path, the improvement comprising:

a take-up holder rotatably mounted in the cartridge for rotation in one direction to receive and coil advanced film, and for rotation in the opposite direction for discharging film, said holder having a bottom wall for engaging an edge of the convolutions forming the coil, and a side wall for engaging the outer most convolution of the coil, a feeder arm having a film passage therein and being movably mounted adjacent the take-up holder for receiving film advanced past the exposure aperture; and means for moving said arm to direct a lead portion of the received film as it emerges from the passage into engagement with the side wall of the holder to cause the holder to rotate by force of the advanced film, and to direct subsequent portions of the received film onto the innermost convolution of the film coil to thereby cause the film to convolute radially inwardly of the side wall within the holder.

7. In a film cartridge for use in a motion picture camera having film advancing means, said cartridge having means defining a supply chamber, an exposure aperture, a take-up chamber and guide means for guiding advanced film from the supply chamber past the exposure aperture, the improvement comprising:

a take-up holder rotatably mounted in the take-up chamber for receiving the advanced film and forming the received film into a coil, said holder defining a bottom surface and a side surface for engaging film;

a movable feeder arm having a film passage therein for receiving film advanced past the exposure aperture and for discharging the received film as it emerges from the passage into the take-up holder, said arm being biased radially outwardly of said holder toward the side wall of said holder; and follower means mounted on the arm and extending into the holder, to space the arm radially inwardly of the side surface of the holder and film coiled in the holder for directing a lead portion of the received film as it is discharged from the passage into engagement with the side surface of the holder to cause the holder to rotate and coil the film engaging the side wall, and for directing subsequent portions of the received film radially inwardly of the innermost convolution of film coiled in the holder.

8. The improvement claimed in claim 7, further comprising:

indicator means connected to the feeder arm for indicating the position of said arm as a measure of the amount of film in the holder.

9. A film cartridge for use in a motion picture camera, said camera having means defining a chamber for receiving the film cartridge, film advancing means for advancing film in the cartridge when the cartridge is loaded in the camera, sound recording means, means defining a film path for directing film from the cartridge loaded in the camera to the sound recording means and back to the cartridge, and a detent extending into the chamber for engaging the cartridge loaded in the chamber, said cartridge having means defining a supply chamber, and an exposure aperture, and comprising means for guiding film advanced by the film advancing means from the supply chamber past the exposure aperture, a film exit aperture for permitting film advance past the exposure aperture to be guided out of the cartridge, a film entrance aperture for permitting the film directed out of the cartridge to be admitted back into the cartridge, said exit and entrance apertures being aligned with the film path defined by the camera when the cartridge is loaded in the camera such that film directed out of the exit aperture is guided along the film path to the sound recording means and back to the entrance aperture in the cartridge, and slide means movable from a closed position for covering the entrance and exit apertures in the cartridge to an open position by said detent when the cartridge is loaded in the camera for uncovering the entrance and exit apertures in the cartridge.

10. A film cartridge for use in a motion picture camera, said camera having means defining a chamber for receiving the film cartridge, film advancing means for advancing film in the cartridge when the cartridge is loaded in the camera, sound recording means, means defining a film path for directing film from the cartridge in the chamber to the sound recording means and back to the cartridge, and a detent extending into the chamber for engaging the cartridge as an indication of the sound recording capability of the camera;

said cartridge comprising:
means defining a supply chamber;
an exposure aperture;
means for directing film advanced by the film advancing means from the supply chamber past the exposure aperture;

a take-up holder rotatably mounted in the take-up chamber for receiving and coiling film advanced past the exposure aperture, said holder having a side wall having a film engaging surface;

guide means for directing a lead portion of the film advanced past the exposure aperture into engagement with the film engaging surface of said holder to cause said holder to rotate and coil the film in said holder, and for directing subsequent portions of the film advanced past the exposure aperture radially inwardly of the innermost convolution of film coiled in the holder; and slide means movable by said detent when the cartridge is loaded in the camera for defining an alternate film path for directing film advanced past the exposure aperture out of the cartridge to the film path defined by the camera and for receiving said film back into the cartridge and guiding said received film to said guide means.

11. In a film cartridge for use in a motion picture camera, said camera having means defining a chamber for receiving the film cartridge, film advancing means for advancing film in the cartridge when the cartridge is loaded in the camera, sound recording means, and means defining a film path for directing film from the cartridge in the chamber to the sound recording means and back to the cartridge, said cartridge having means defining a supply chamber, an exposure aperture, a take-up chamber and means for guiding film advanced by the film advancing means from the supply chamber past the exposure aperture, the improvement comprising:

means for directing film advanced past the exposure aperture out of the cartridge to the film path defined by the camera;

means for receiving the film from the film path defined by the camera back into the cartridge;

means for directing film received back into the cartridge into the take-up chamber;

means in the cartridge defining a second film path bypassing the sound recording means;

means in cartridge for selectively directing film to one of the film paths, and means for causing the film received in the take-up chamber to be convoluted radially inwardly within said chamber.

References Cited
UNITED STATES PATENTS

| | | | |
|---|---|---|---|
| 2,238,719 | 4/1941 | Tartas | 242—71.1X |
| 2,326,654 | 8/1943 | Jagust | 352—78X |
| 2,673,500 | 3/1954 | Cassidy et al. | 352—78X |
| 3,342,541 | 9/1967 | Mouissie et al. | 352—123 |
| 3,442,580 | 5/1969 | Winkler | 352—29 |

S. CLEMENT SWISHER, Primary Examiner

U.S. Cl. X.R.

242—55.21, 194, 199